(12) United States Patent
Gutman et al.

(10) Patent No.: US 11,903,011 B2
(45) Date of Patent: Feb. 13, 2024

(54) ADJUSTING BASE STATION TRANSMIT POWER BASED ON USER EQUIPMENT SIGNAL MEASUREMENTS

(71) Applicant: QUALCOMM Incorporated, San Diego, CA (US)

(72) Inventors: Igor Gutman, Hod HaSharon (IL); Navid Abedini, Basking Ridge, NJ (US); Pushkar Bajirao Kulkarni, San Diego, CA (US); Joseph Patrick Burke, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/452,889

(22) Filed: Oct. 29, 2021

(65) Prior Publication Data

US 2023/0133987 A1    May 4, 2023

(51) Int. Cl.
| | |
|---|---|
| *H04W 72/542* | (2023.01) |
| *H04B 17/10* | (2015.01) |
| *H04B 1/04* | (2006.01) |
| *H04L 5/00* | (2006.01) |

(52) U.S. Cl.
CPC ........ *H04W 72/542* (2023.01); *H04B 1/0475* (2013.01); *H04B 17/101* (2015.01); *H04L 5/0048* (2013.01)

(58) Field of Classification Search
CPC . H04W 52/24; H04W 52/36; H04W 72/0453; H04W 72/23; H04W 72/541; H04W 72/085; H04L 1/1812; H04L 1/1864; H04L 5/0048; H04B 1/0475
See application file for complete search history.

(56) References Cited

U.S. PATENT DOCUMENTS

| | | | |
|---|---|---|---|
| 2007/0042726 A1* | 2/2007 | Ohba | H03F 1/3247 455/114.1 |
| 2017/0070276 A1* | 3/2017 | Kim | H04W 72/21 |
| 2022/0150901 A1* | 5/2022 | Wyville | H04B 17/373 |

* cited by examiner

*Primary Examiner* — Iqbal Zaidi
(74) *Attorney, Agent, or Firm* — Polsinelli

(57) ABSTRACT

Disclosed are techniques for performing wireless communication. In some aspects, a wireless communication device may receive a signal transmission from a base station and determine a non-linear distortion power measurement associated with the signal transmission and a thermal noise power measurement associated with the signal transmission. The wireless communication device may transmit an indication of at least one of the non-linear distortion power measurement and the thermal noise power measurement to the base station.

30 Claims, 9 Drawing Sheets

ADJUSTING BASE STATION TRANSMIT POWER BASED ON USER EQUIPMENT SIGNAL MEASUREMENTS

FIELD OF THE DISCLOSURE

Aspects of the present disclosure generally relate to wireless communication. In some implementations, examples are described for adjusting base station transmit power based on user equipment (UE) signal measurements.

BACKGROUND OF THE DISCLOSURE

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one example, a method is provided for wireless communication. The method may include: receiving, by a user equipment (UE), a signal transmission from a base station; measuring, by the UE, a non-linear distortion power measurement associated with the signal transmission and a thermal noise power measurement associated with the signal transmission; and transmitting, by the UE to the base station, an indication of at least one of the non-linear distortion power measurement and the thermal noise power measurement.

In another example, a wireless communication device for wireless communication is provided that includes at least one memory, at least one transceiver, and at least one processor (e.g., configured in circuitry) communicatively coupled to the at least one memory and the at least one transceiver. The at least one processor may be configured to: receive, via the at least one transceiver, a signal transmission from a base station; measure a non-linear distortion power measurement associated with the signal transmission and a thermal noise power measurement associated with the signal transmission; and transmit, via the at least one transceiver to the base station, an indication of at least one of the non-linear distortion power measurement and the thermal noise power measurement.

In another example, a non-transitory computer-readable medium of a wireless communication device is provided that includes stored thereon at least one instruction that, when executed by one or more processors, may cause the one or more processors to: receive a signal transmission from a base station; measure a non-linear distortion power measurement associated with the signal transmission and a thermal noise power measurement associated with the signal transmission; and transmit, to the base station, an indication of at least one of the non-linear distortion power measurement and the thermal noise power measurement.

In another example, an apparatus for wireless communication is provided. The apparatus may include: means for receiving a signal transmission from a base station; means for measuring a non-linear distortion power measurement associated with the signal transmission and a thermal noise power measurement associated with the signal transmission; and means for transmitting, to the base station, an indication of at least one of the non-linear distortion power measurement and the thermal noise power measurement.

In another example, a method for wireless communication is provided. The method may include: transmitting, by a base station, a first signal transmission to a user equipment (UE); receiving, by the base station, an indication of at least one of a non-linear distortion power measurement and a thermal noise power measurement associated with the first signal transmission; and adjusting a transmit power level associated with a second signal transmission to the UE based on the indication.

In another example, a base station is provided that includes at least one memory, at least one transceiver, and at least one processor (e.g., configured in circuitry) communicatively coupled to the at least one memory and the at least one transceiver. The at least one processor may be configured to: transmit, via the at least one transceiver, a first signal transmission to a user equipment (UE); receive, via the at least one transceiver, an indication of at least one of a non-linear distortion power measurement and a thermal noise power measurement associated with the first signal transmission; and adjust a transmit power level associated with a second signal transmission to the UE based on the indication.

In another example, a non-transitory computer-readable medium is provided that includes stored thereon at least one instruction that, when executed by one or more processors, may cause the one or more processors to: transmit a first signal transmission to a user equipment (UE); receive an indication of at least one of a non-linear distortion power measurement and a thermal noise power measurement associated with the first signal transmission; and adjust a transmit power level associated with a second signal transmission to the UE based on the indication.

In another example, an apparatus for wireless communication is provided. The apparatus may include: means for transmitting a first signal transmission to a user equipment (UE); means for receiving an indication of at least one of a non-linear distortion power measurement and a thermal noise power measurement associated with the first signal transmission; and means for adjusting a transmit power level associated with a second signal transmission to the UE based on the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
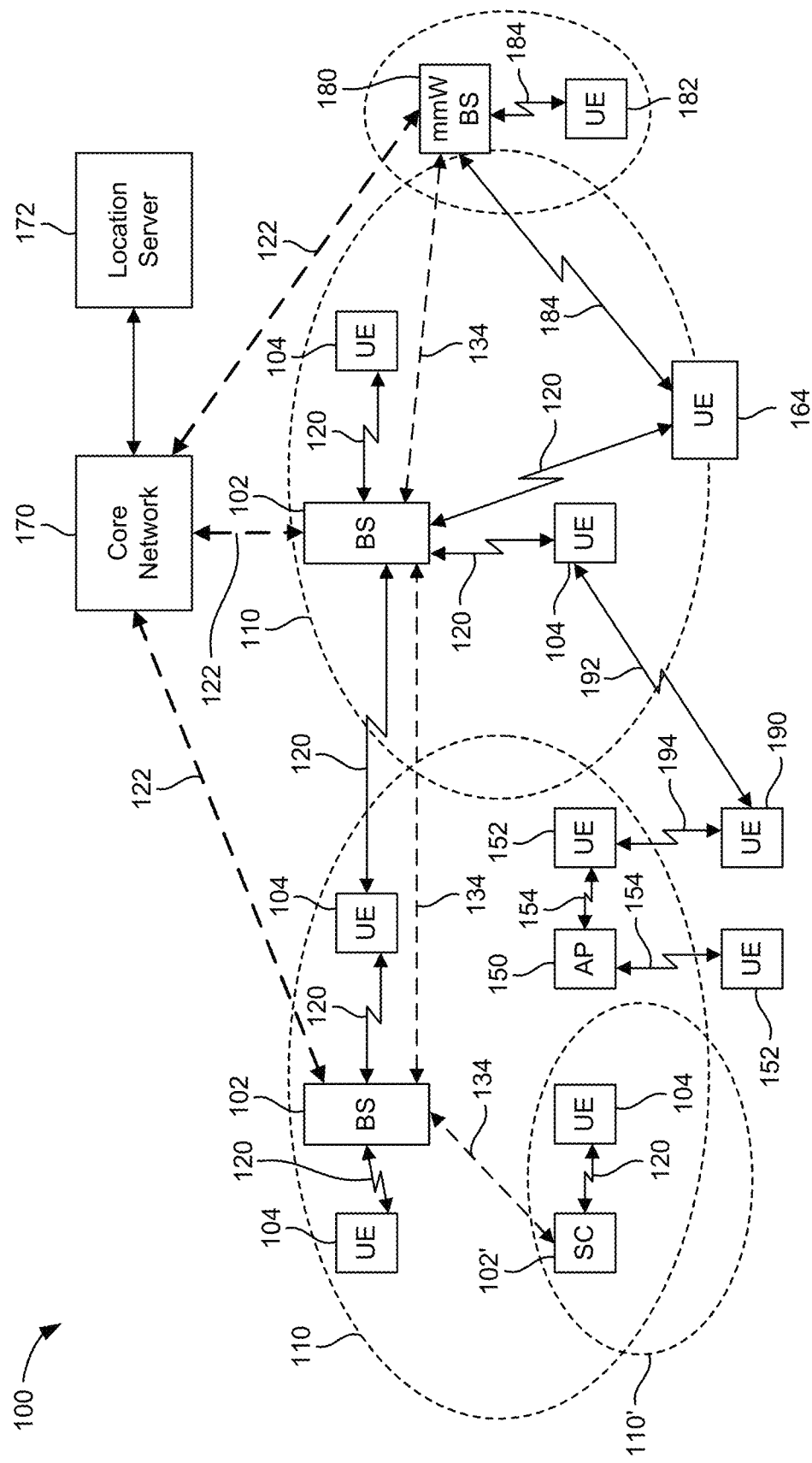
FIG. 1 illustrates an exemplary wireless communications system, according to aspects of the disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Wireless communication networks are deployed to provide various communication services such as voice, video, packet data, messaging, broadcast, and the like. A wireless communication network may support both access links and sidelinks for communication between wireless devices. An access link may refer to any communication link between a client device (e.g., a user equipment (UE), a Wi-Fi station (STA), or other client device) and a base station (e.g., a 3GPP gNB, a 3GPP eNB, a Wi-Fi access point (AP), or other base station). For example, an access link may support uplink signaling, downlink signaling, connection procedures, etc.

In some cases, downlink transmissions (e.g., from a base station to a UE) may be adversely affected by thermal noise and non-linear distortions. For example, a transmitter (e.g., in a base station) may include non-linear components such as high-power amplifiers (PAs) that may have a limited linear dynamic range (DR). In some cases, the PA may distort the transmitted downlink signal due to high peak-to-average-power ratio (PAPR).

The non-linear distortion in downlink transmissions may include in-band distortion that may affect the performance of the downlink channel (e.g., based on metrics such as mutual information (MI) and/or error vector magnitude (EVM)). The non-linear distortion may also include out-band distortion that causes adjacent channel interference (ACI) (e.g., indicates how much the adjacent channel is "polluted" by the main transmission). In order to minimize non-linear distortion, power output back-off (outBO) may be implemented in which the output power of the PA is reduced relative to the maximum output level. However, increasing outBO (e.g., reducing transmit power) results in lower efficiency due to higher heat dissipation. In addition, decreasing outBO (e.g., increasing transmit power) results in the transmit signal being clipped, which also limits downlink channel throughput.

Additional methods for managing non-linear distortion include digital predistortion (DPD) and crest factor reduction (CFR). However, DPD is limited in that it may only manage polynomial distortion within a dynamic range. In some cases, multiple PAs may be used by a transmitter and implementing DPD per transmitter element may not be feasible due to cost.

Further, DPD and/or CFR techniques are implemented by the transmitter without feedback from the receiver regarding signal-to-noise ratio (SNR), thermal noise, and/or non-linear distortion. For instance, a base station may receive a channel state feedback (CSF) report from a UE that may be used to determine a channel quality index (CQI), a rank indicator (RI), and/or a precoding matrix indicator (PMI) in the cellular link to optimize the throughput. However, the CSF report does not include any information regarding noise floor components (e.g., thermal noise, non-linear distortion) at the receiver. Consequently, the base station cannot determine if a CQI value is limited by thermal noise, by non-linear distortion, or by a digital post-distortion (DPoD) algorithm implemented by the UE in order to reduce non-linear distortion. As a result, the base station is not able to intelligently modify transmit power (e.g., implement outBO) for downlink transmission to the UE.

Systems, apparatuses, processes (also referred to as methods), and computer-readable media (collectively referred to as "systems and techniques") are described herein for adjusting transmitter power from a base station based on user equipment signal measurements. The systems and techniques provide the ability for client devices (e.g., UEs, STAB, or other client devices) to measure non-linear distortion power and thermal noise power associated with downlink transmission from a base station. The systems and techniques also provide the ability for client devices to provide an indication of the measurements (e.g., signal) to the base station in order to adjust the transmit power and optimize channel throughput.

In some aspects, a UE may obtain one or more measurements associated with a downlink transmission from a base station. In some cases, the downlink transmission may correspond to a reference signal such as a channel state information reference signal (CSI-RS). In some aspects, the downlink transmission may correspond to a physical downlink shared channel (PDSCH) transmission. In some examples, the one or more measurements may include a non-linear distortion power measurement, a thermal noise power measurement, a signal-to-noise ratio (SNR), signal-to-noise and interference ratio (SINR), reference signal received power (RSRP), received signal strength indicator (RSSI), any other suitable measurement, and/or any combination thereof.

In some configurations, a UE may implement a digital post-distortion (DPoD) algorithm that may be used for reducing non-linear distortion of DL signals received from a base station. In some aspects, a UE may obtain the one or more measurements before and/or after implementing the DPoD algorithm. For example, a UE may measure non-linear distortion prior to implementing DPoD and/or after implementing DPoD.

In some cases, a UE may determine a noise parameter that indicates a relation between non-linear distortion power and thermal noise power. In some aspects, a pre-DPoD noise parameter may correspond to a relation (e.g., difference, ratio, etc.) between a thermal noise power measurement and a pre-DPoD non-linear distortion power measurement. In some cases, a pre-DPoD noise parameter may be referred to herein as Xpre. In some aspects, a post-DPoD noise parameter may correspond to a relation (e.g., difference, ratio, etc.) between a thermal noise power measurement and a post-DPoD non-linear distortion power measurement. In some examples, a post-DPoD noise parameter may be referred to herein as Xpost.

In some aspects, a base station may adjust the transmit power level for downlink transmission to a UE based on the pre-DPoD noise parameter and/or the post-DPoD noise parameter. In some examples, the value of the pre-DPoD noise parameter and/or the post-DPoD noise parameter may indicate whether channel throughput is limited by thermal noise or non-linear distortion. In one illustrative example, a value of the post-DPoD noise parameter (or the pre-DPoD noise parameter) may indicate that channel throughput is limited by thermal noise and may cause a base station to increase the transmit power level for downlink transmissions to the UE. In another illustrative example, a value of the post-DPoD noise parameter (or the pre-DPoD noise parameter) may indicate that channel throughput is limited by non-linear distortion and may cause a base station to decrease the transmit power level for downlink transmissions to the UE.

Additional aspects of the present disclosure are described in more detail below.

As used herein, the term "communication unit" is a system, device, or component of a UE (e.g., a vehicle, a user device, etc.) and/or other device (e.g., a road side unit (RSU) or other device) that may include a telematics control unit (TCU), a network access device (NAD), a modem, a subscriber identity module (SIM), a transceiver (or individual receiver and/or transmitter), any combination thereof, and/or other system, device, or component configured to perform wireless communication operations.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "user device," a "user terminal" or UT, a "client device," a "wireless device," a "wireless communication device," a "subscriber device," a "subscriber terminal," a "subscriber station," a "mobile device," a "mobile terminal," a "mobile station," or variations thereof. Generally, UEs may communicate with a core network via a RAN, and through the core network the UEs may be connected with external networks such as the Internet and with other UEs. UEs may also communicate with other UEs and/or other devices as described herein. In some cases, other mechanisms of connecting to the core network, the Internet, and other UEs are also possible for the UEs, such as over wired access networks, wireless local area network (WLAN) networks (e.g., based on IEEE 802.11, based on ultra-wideband (UWB), etc.), and so on.

A base station may operate according to one of several RATs in communication with UEs, RSUs, and/or other devices, depending on the network in which it is deployed. In some cases, a base station may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, a forward traffic channel, etc.). As used herein the term traffic channel (TCH) may refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

According to various aspects, FIG. 1 illustrates an example of a wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a radio access network (RAN) and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies may be referred to as the FR2 band (e.g., including a frequency range of 24250 MHz to 52600 MHz). In some examples, the wireless communications system 100 may include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN or Wi-Fi STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, UWB, and so on.

Figure 2:
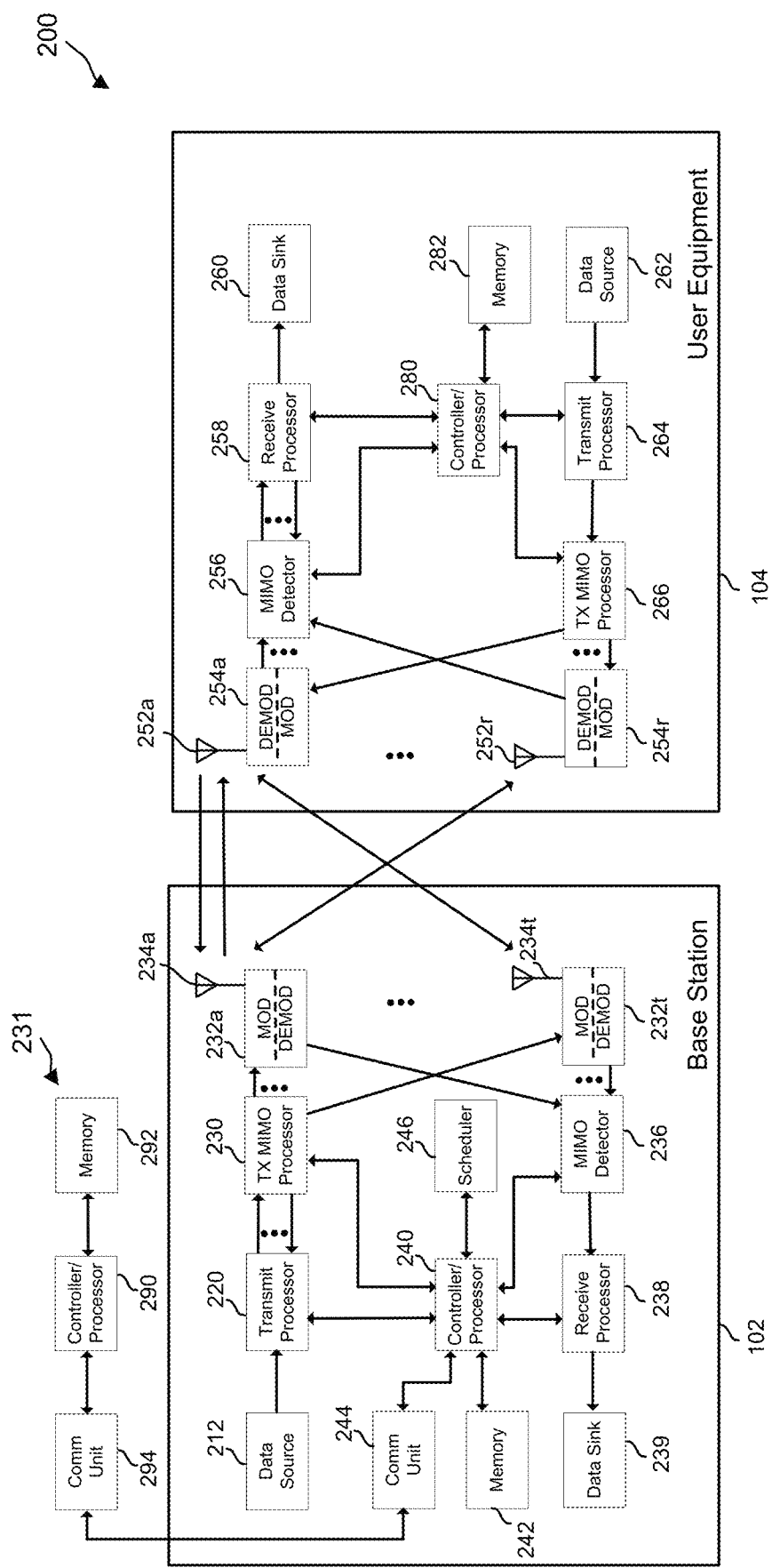
FIG. 2 is a diagram illustrating a design of a base station and a User Equipment (UE) that enable transmission and processing of signals exchanged between the UE and the base station, according to aspects of the disclosure.

FIG. 2 shows a block diagram of a design 200 of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). Transmit processor 220 may also configure the transmit power level associated with one or more power amplifiers (not illustrated).

A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators may be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. In some cases, T downlink signals may be transmitted from modulators 232a to 232t via T power amplifiers (PAs—not illustrated) using T antennas 234a through 234t, respectively.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators may be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some implementations, the UE 104 can include: means for receiving a signal transmission from a base station; means for measuring a non-linear distortion power measurement associated with the signal transmission and a thermal noise power measurement associated with the signal transmission; and means for transmitting, to the base station, an indication of at least one of the non-linear distortion power measurement and the thermal noise power measurement. In some examples, the means for measuring may include controller/processor 280, memory 282, receive processor 258, transmit processor 264, any combination thereof, or any other component(s) of the UE 104. In some cases, the means for receiving may include controller/processor 280, receive processor 258, MIMO detector 256, DEMODs 254a through 254r, antennas 252a through 252r, any combination thereof, or any other component(s) of the UE 104. In some examples, the means for transmitting can include controller/processor 280, transmit processor 264, TX MIMO processor 266, DEMODs 254a through 254r, antennas 252a through 252r, any combination thereof, or any other component(s) of the UE 104.

In some examples, the base station 102 can include: means for transmitting a first signal transmission to a user equipment (UE); means for receiving an indication of at least one of a non-linear distortion power measurement and a thermal noise power measurement associated with the first signal transmission; and means for adjusting a transmit power level associated with a second signal transmission to the UE based on the indication. In some examples, the means for transmitting may include controller/processor 240, transmit processor 220, TX MIMO processor 230, DEMODs 232a through 232t, antennas 234a through 252r, any combination thereof, or any other component(s) of the base station 102. In some aspects, the means for receiving may include controller/processor 240, receive processor 238, MIMO detector 236, DEMODs 232a through 232t, antennas 234a through 252r, any combination thereof, or any other component(s) of the base station 102. In some cases, the means for adjusting may include controller/processor 240, memory 242, transmit processor 220, TX MIMO processor 230, any combination thereof, or any other component(s) of the base station 102.

Figure 3:
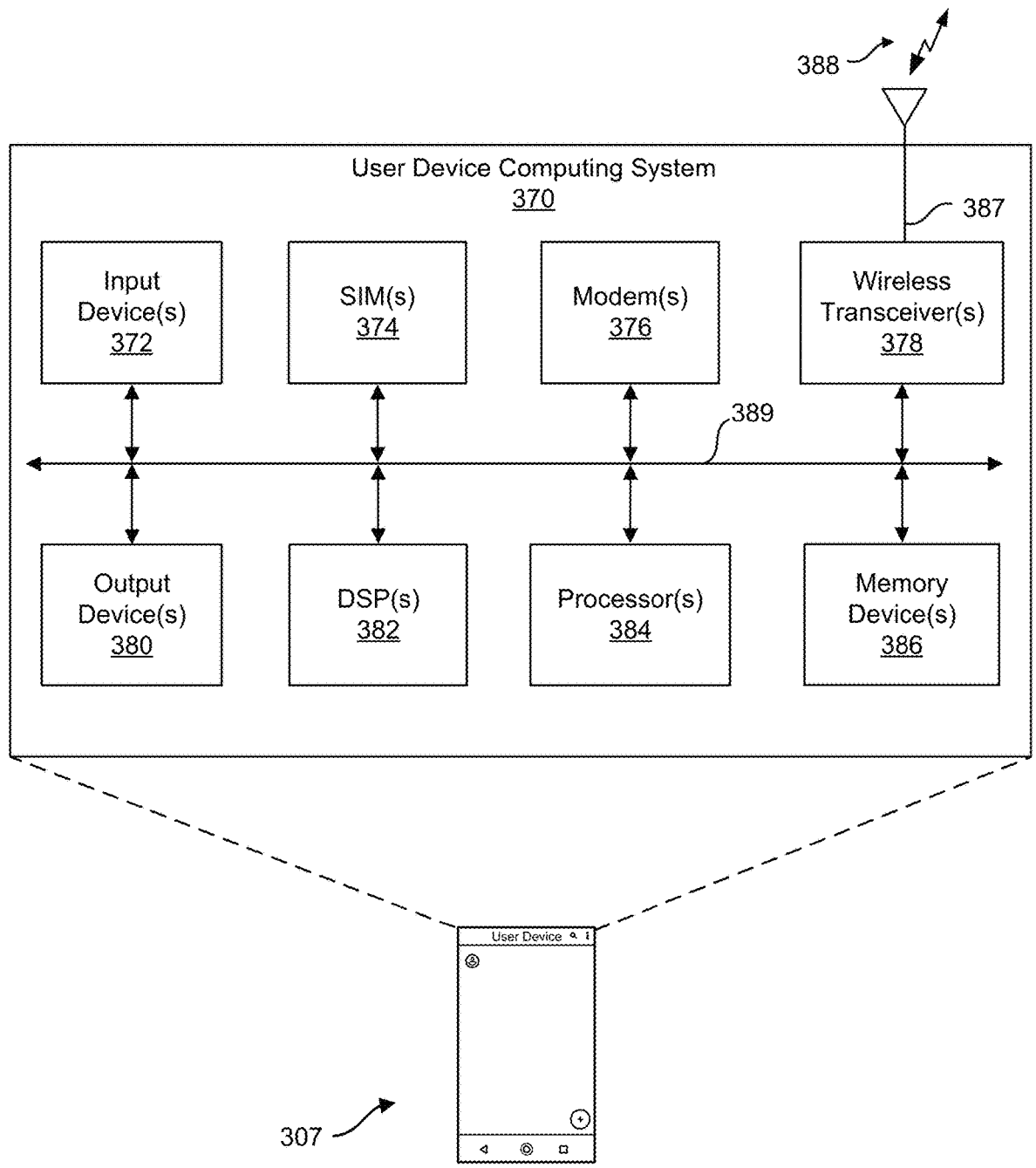
FIG. 3 is a block diagram illustrating an example of a computing system of a user device, according to aspects of the disclosure.

FIG. 3 illustrates an example of a computing system 370 of a wireless device 307. The wireless device 307 may include a client device such as a UE (e.g., UE 104, UE 152, UE 190) or other type of device (e.g., a Wi-Fi station (STA) configured to communicate using a Wi-Fi interface) that may be used by an end-user. Wireless device 307 may also include network devices (e.g., base stations such as eNBs and/or gNBs, Wi-Fi access points (APs) such as routers, range extenders or the like, etc.). For example, the wireless device 307 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, and/or another device that is configured to communicate over a wireless communications network. The computing system 370 includes software and hardware components that may be electrically or communicatively coupled via a bus 389 (or may otherwise be in communication, as appropriate). For example, the computing system 370 includes one or more processors 384. The one or more processors 384 may include one or more CPUs, ASICs, FPGAs, APs, GPUs, VPUs, NSPs, microcontrollers, dedicated hardware, any combination thereof, and/or other processing device or system. The bus 389 may be used by the one or more processors 384 to communicate between cores and/or with the one or more memory devices 386.

The computing system 370 may also include one or more memory devices 386, one or more digital signal processors (DSPs) 382, one or more SIMS 374, one or more modems 376, one or more wireless transceivers 378, an antenna 387, one or more input devices 372 (e.g., a camera, a mouse, a keyboard, a touch sensitive screen, a touch pad, a keypad, a microphone, and/or the like), and one or more output devices 380 (e.g., a display, a speaker, a printer, and/or the like).

In some aspects, computing system 370 may include one or more radio frequency (RF) interfaces configured to transmit and/or receive RF signals. In some examples, an RF interface may include components such as modem(s) 376, wireless transceiver(s) 378, and/or antennas 387. The one or more wireless transceivers 378 may transmit and receive wireless signals (e.g., signal 388) via antenna 387 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 370 may include multiple antennas or an antenna array that may facilitate simultaneous transmit and receive functionality. Antenna 387 may be an omnidirectional antenna such that radio frequency (RF) signals may be received from and transmitted in all directions. The wireless signal 388 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 388 may be transmitted directly to other wireless devices using sidelink communications (e.g., using a PC5 interface, using a DSRC interface, etc.). Wireless transceivers 378 may be configured to transmit RF signals for performing sidelink communications via antenna 387 in accordance with one or more transmit power parameters that may be associated with one or more regulation modes. Wireless transceivers 378 may also be configured to receive sidelink communication signals having different signal parameters from other wireless devices.

In some examples, the one or more wireless transceivers 378 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 388 into a baseband or intermediate frequency and may convert the RF signals to the digital domain.

In some cases, the computing system 370 may include a coding-decoding device (or CODEC) configured to encode and/or decode data transmitted and/or received using the one or more wireless transceivers 378. In some cases, the computing system 370 may include an encryption-decryption device or component configured to encrypt and/or decrypt data (e.g., according to the AES and/or DES standard) transmitted and/or received by the one or more wireless transceivers 378.

The one or more SIMS 374 may each securely store an international mobile subscriber identity (IMSI) number and related key assigned to the user of the wireless device 307. The IMSI and key may be used to identify and authenticate the subscriber when accessing a network provided by a network service provider or operator associated with the one or more SIMs 374. The one or more modems 376 may modulate one or more signals to encode information for transmission using the one or more wireless transceivers 378. The one or more modems 376 may also demodulate signals received by the one or more wireless transceivers 378 in order to decode the transmitted information. In some examples, the one or more modems 376 may include a Wi-Fi modem, a 4G (or LTE) modem, a 5G (or NR) modem, and/or other types of modems. The one or more modems 376 and the one or more wireless transceivers 378 may be used for communicating data for the one or more SIMs 374.

The computing system 370 may also include (and/or be in communication with) one or more non-transitory machine-readable storage media or storage devices (e.g., one or more memory devices 386), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 386 and executed by the one or more processor(s) 384 and/or the one or more DSPs 382. The computing system 370 may also include software elements (e.g., located within the one or more memory devices 386), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the wireless device 307 may include means for performing operations described herein. The means may include one or more of the components of the computing system 370. For example, the means for performing operations described herein may include one or more of input device(s) 372, SIM(s) 374, modems(s) 376, wireless transceiver(s) 378, output device(s) (380), DSP(s) 382, processors (384), memory device(s) 386, and/or antenna(s) 387.

Figure 4:
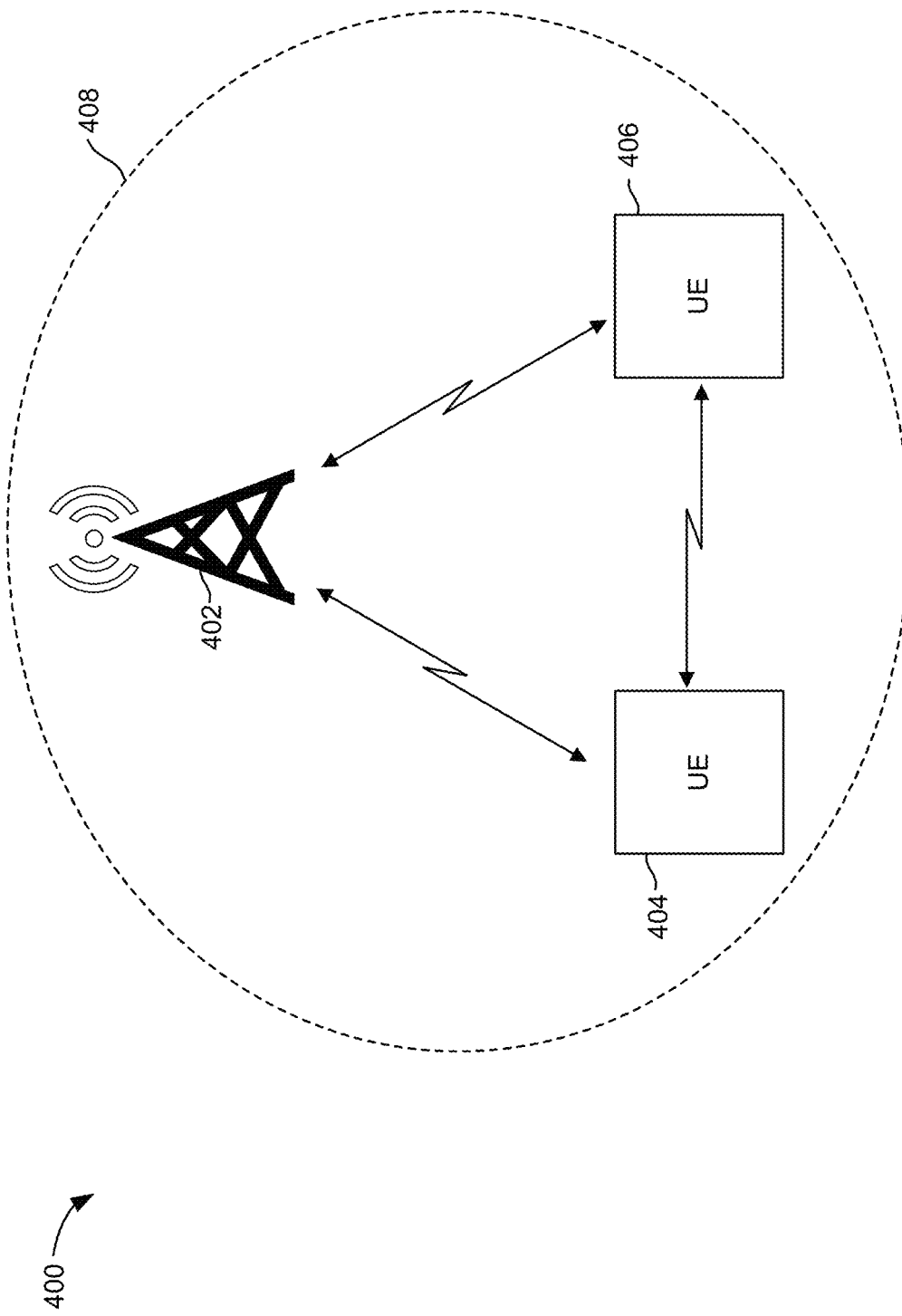
FIG. 4 is a diagram illustrating an example wireless communication system for adjusting base station transmit power based on user equipment signal measurements, according to aspects of the disclosure.

As noted previously, systems and techniques are described herein for adjusting base station transmit power based on user equipment (UE) signal measurements. FIG. 4 is a diagram illustrating an example wireless communications system 400 for modifying the transmit power used by a base station based on UE signal measurements. While the system 400 is described using user equipment (UE) and base stations (BSs) as illustrative examples, the techniques described with respect to the system 400 can be performed by Wi-Fi stations (STA) and access points (APs) or by other devices that communicate using other communication protocols.

In some aspects, the system 400 may include a base station 402 that can be associated with coverage area 408. In some cases, base station 402 may include macro cell base stations and/or small cell base stations, as described in connection with system 100 (e.g., base stations 102). In other aspects, base station 402 may include a wireless access point, such as, for example, AP 150 described in connection with system 100.

In some examples, system 400 may include one or more user equipment (UE) devices, such as UE 404 and UE 406 that are within coverage area 408 of base station 402. As noted with respect to FIG. 1, a UE may include and/or be referred to as an access terminal, a user device, a user terminal, a client device, a wireless device, a subscriber device, a subscriber terminal, a subscriber station, a mobile device, a mobile terminal, a mobile station, or variations thereof. In some aspects, a UE may include a mobile telephone or so-called "smart phone", a tablet computer, a wearable device, an extended reality device (e.g., a virtual reality (VR) device, an augmented reality (AR) device, or a mixed reality (MR) device), a personal computer, a laptop computer, an internet of things (IoT) device, a television, a vehicle (or a computing device of a vehicle), or any other device having a radio frequency (RF) interface.

In some aspects, UE 404 and UE 406 may communicate with base station 402 in uplink (UL) and/or downlink (DL) directions. DL refers to the transmission direction from base station 402 to a UE, and UL refers to the transmission direction from a UE (e.g., UE 404, UE 406) to base station 402. In some examples, one or more of the UEs may utilize sidelink communications to communicate directly with each other. As illustrated, UE 404 and UE 406 may communicate directly via sidelink.

In some examples, base station 402 may include a power amplifier (PA) that may be configured to increase the power level of DL signals transmitted to UE 404 and/or UE 406. In some cases, base station 402 may adjust the power level (e.g., increase or decrease the amplification by the PA) of DL signals to improve PA efficiency, improve signal throughput (e.g., bits per channel use), and/or reduce signal distortion. For example, base station 402 may implement power output back-off (outBO) to reduce non-linear distortion (e.g., in-band distortion) and/or out-band distortion (e.g., reduce adjacent channel interference (ACI)).

In some aspects, base station 402 may implement a crest factor reduction (CFR) algorithm that may reduce the dynamic range of DL signals (e.g., reduce peak to average power ratio (PAPR)). In some cases, base station 402 may implement a digital pre-distortion (DPD) technique (e.g., at the input signal of PA) to reduce or cancel distortion generated by the PA. In some examples, base station 402 may use CFR and/or DPD to improve PA efficiency. In some cases, base station 402 may use CFR and/or DPD to increase transmit power (e.g., reduce outBO).

In some aspects, UE 404 and/or UE 406 may perform measurements on DL signals received from base station 402. In some examples, base station 402 may adjust the power level of DL signals based on signal measurements reported by UE 404 and/or UE 406. In some cases, UE 404 and/or UE 406 may perform measurements on reference signals from base station 402. In some aspects, the reference signals may include a channel state information reference signal (CSI-RS), a demodulation reference signal (DMRS), a phase tracking reference signal (PTRS) and/or any other type of reference signal. In some instances, UE 404 and/or UE 406 may perform measurements on data signals (e.g., signal transmissions received via the Physical Downlink Shared Channel (PDSCH)) from base station 402. In some aspects, the measurements may include a non-linear distortion power measurement, a thermal noise power measurement, a signal-to-noise ratio (SNR), signal-to-noise and interference ratio (SINR), reference signal received power (RSRP), received signal strength indicator (RSSI), any other suitable measurement, and/or any combination thereof.

In some cases, UE 404 and/or UE 406 may implement receiver side techniques for reducing distortion of DL signals. For example, UE 404 and/or UE 406 may perform a digital post-distortion (DPoD) algorithm that may be used for reducing non-linear distortion of DL signals received from base station 402. In some examples, a DPoD algorithm may be used to reduce clipping of the PA output as the transmit power level is increased. In some aspects, a DPoD algorithm may be performed using a single-input single-output (SISO) additive white Gaussian noise (AWGN) implementation. In some examples, the input/output of DPoD algorithm may be expressed according to the following equation:

$$y = y_{init} = G(x) + n \qquad (1)$$

where $G(\ )$ is a power amplifier nonlinearity model and x is an input to the power amplifier (PA) nonlinearity model. In some cases, the DPoD algorithm may correspond to the frequency domain (FD), and a hard decision (HD) may correspond to following equation:

$$\check{X} = HD(\alpha \cdot FFT(y)) \qquad (2)$$

In some examples, the power amplifier (PA) may be modeled according to the following equation:

$$\check{y} = \check{G}(IFFT(\check{X})) \qquad (3)$$

In some aspects, d̆ may be modeled according to following equation:

$$\check{d} = \check{y} - \alpha \cdot \check{x} \qquad (4)$$

In some instances, d̆ may then be subtracted from y̌ to determine y, as follows:

$$y = y_{init} - \check{d} \qquad (5)$$

In some cases, the operations of equations (2)-(5) may be repeated for n number of iterations to achieve convergence. In some aspects, the Bussgang theorem may be used to reduce the n number of iterations for convergence. In some examples, one or more iterations of HD may be replaced with a soft decision (SD) to reduce computational complexity. The HD includes slicing of the symbols. The SD (which does not slice the symbols) exploits coding gain to make a better HD. In some aspects, the DPoD algorithm may be implemented using a combination of HD and SD (e.g., a first iteration may use SD and a following iteration may use HD).

In some aspects, UE 404 and/or UE 406 may perform signal measurements before and/or after implementing a DPoD algorithm. For example, UE 404 may determine non-linear distortion power, thermal noise power measurement, signal-to-noise ratio (SNR), etc. that is associated with a DL signal (e.g., CSI-RS) prior to implementing a DPoD algorithm and/or after implementing a DPoD algorithm. In some examples, UE 404 and/or UE 406 may send one or more of the measurements (e.g., pre-DPoD and/or post-DPoD) to base station 402.

In some cases, UE 404 and/or UE 406 may calculate a noise parameter that indicates a relation between non-linear distortion power and thermal noise power. In some aspects, a pre-DPoD noise parameter may correspond to a relation (e.g., difference, ratio, etc.) between a thermal noise power measurement and a pre-DPoD non-linear distortion power measurement (e.g., non-linear distortion power measured prior to implementing DPoD algorithm). In some cases, a pre-DPoD noise parameter may be referred to herein as Xpre. In some aspects, a post-DPoD noise parameter may correspond to a relation (e.g., difference, ratio, etc.) between a thermal noise power measurement and a post-DPoD non-linear distortion power measurement (e.g., non-linear distortion power measured after implementing DPoD algorithm). In some examples, a post-DPoD noise parameter may be referred to herein as Xpost.

In some examples, UE 404 and/or UE 406 may send the post-DPoD noise parameter (e.g., Xpost) and/or the pre-DPoD noise parameter (Xpre) to base station 402. In some cases, the post-DPoD noise parameter and/or the pre-DPoD noise parameter may be sent (e.g., signaled) to base station 402 as part a channel state feedback (CSF) report (e.g., channel state information (CSI) report). For example, UE 404 may calculate the post-DPoD noise parameter and/or the pre-DPoD noise parameter based on a CSI-RS and provide the noise parameter(s) as part of a CSI report. In some aspects, the post-DPoD noise parameter and/or the pre-DPoD noise parameter may be sent (e.g., signaled) to base station 402 as part of an acknowledgment (ACK) or a negative acknowledgment (NACK). For example, UE 404 may calculate the post-DPoD noise parameter and/or the pre-DPoD noise parameter based on a PDSCH transmission and provide the noise parameter(s) as part of a corresponding ACK or NACK.

In some cases, base station 402 may calculate the post-DPoD noise parameter and/or the pre-DPoD noise parameter based on power measurements reported by UE 404 and/or UE 406. In some aspects, base station 102 may adjust, change, modify, optimize, and/or otherwise tune a transmit power level for DL signals based on the pre-DPoD noise parameter, the post-DPoD noise parameter, and/or the one or more measurements received from UE 404 and/or UE 406.

In one illustrative example, UE 404 may measure 20.2 dB of thermal noise power and 30 dB of post DPoD non-linear noise power corresponding to ~20 dB SNR. In some aspects, UE 404 and/or base station 402 may determine that the post-DPoD noise parameter (e.g., Xpost) is approximately −10 dB (e.g., difference between thermal noise power and non-linear noise power). In some aspects, a negative value for the post-DPoD noise parameter may indicate that signal throughput is limited by thermal noise. In some cases, base station 402 may increase the transmit power of DL signals to UE 404 to improve signal throughput. For example, base station 402 may increase the transmit power from 10 dBm to 12 dBm. In some aspects, the increase in transmit power may result in improved SNR (e.g., 21 dB SNR) due to improvement in thermal noise power.

In another illustrative example, UE 406 may measure 30 dB of thermal noise power and 16.2 dB of post DPoD non-linear noise power corresponding to ~16 dB SNR. In some aspects, UE 406 and/or base station 402 may determine that the post-DPoD noise parameter (e.g., Xpost) is approximately 14 dB (e.g., difference between thermal noise power and non-linear noise power). In some aspects, a positive value for the post-DPoD noise parameter may indicate that signal throughput is limited by non-linear distortion. In some cases, base station 402 may decrease the transmit power of DL signals to UE 406 to improve signal throughput. For example, base station 402 may decrease the transmit power from 14 dBm to 12 dBm. In some aspects, the decrease in transmit power may result in improved SNR (e.g., 24 dB SNR) due to improvement in non-linear distortion.

In another illustrative example, base station 402 may receive a Channel State Information (CSI) report from UE 404 indicating that the Channel Quality Indicator (CQI) value is 13. Base station 402 may further determine (e.g., based on calculation or signaling from UE 404) that the post-DPoD noise parameter is 5 dBc. In some aspects, base station 402 may determine that post processing SNR is dominated by non-linear distortion (e.g., positive Xpost value) and the throughput can be improved by decreasing the power level. In some cases, base station 402 may decrease the power level by ~2 dB.

In another illustrative example, base station 402 may receive a CSI report from UE 406 indicating that the CQI value is 13. Base station 402 may further determine (e.g., based on calculation or signaling from UE 404) that the post-DPoD noise parameter is −5 dBc. In some aspects, base station 402 may determine that post processing SNR is dominated by thermal noise (e.g., negative Xpost value) and the throughput can be improved by increasing the power level. In some cases, base station 402 may increase the power level by ~2 dB.

In some aspects, base station 402 may be configured with a table for determining transmit power adjustment based on pre-DPoD noise parameter, post-DPoD noise parameter, SNR, CQI, thermal noise, non-linear distortion, any combination thereof, and/or any other suitable parameter or measurement. In some cases, 1 dB of transmit power adjustment can correspond to approximately 3 dB of non-linear distortion.

Figure 5:
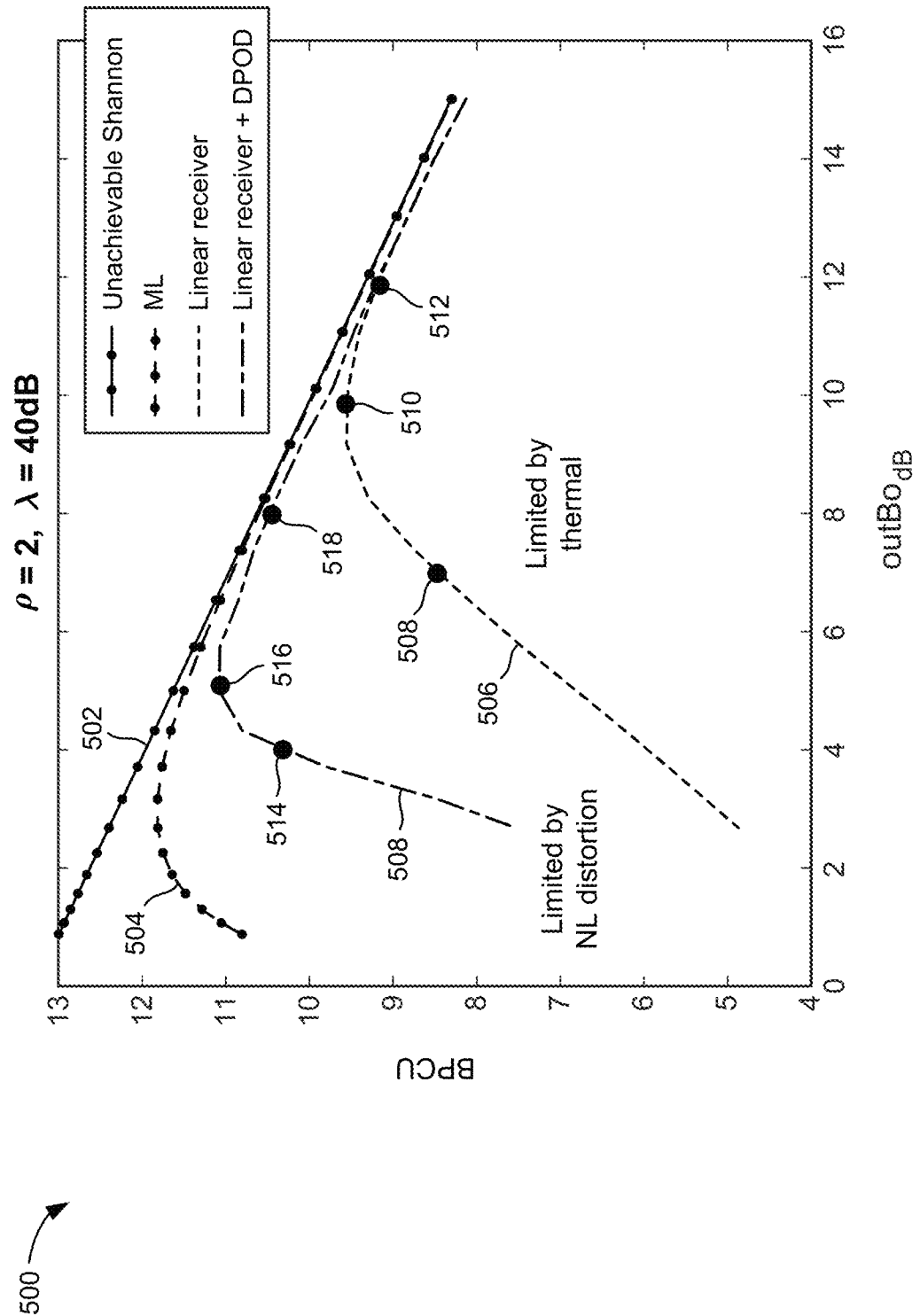
FIG. 5 is a graph illustrating power amplifier performance, according to aspects of the disclosure.

FIG. 5 is a graph 500 illustrating channel throughput relative to transmit power level. Graph 500 illustrates performance for a distance (or loss, such as link budget loss)

$$\lambda = \frac{P_{sat}}{\sigma_n^2} = 40 \text{ dB}$$

and a solid-state power amplifier (SSPA) sharpness ρ=2, where $P_{sat}$ corresponds to the RF PA input voltage and $\sigma_n^2$ corresponds to the power of the thermal noise in the receiver. In graph 500, the x-axis corresponds to power output back-off (outBO) measured in dB (e.g., larger outBO corresponds to lower transmit power) and the y-axis correspond to bits per channel use (BPCU). Graph 500 includes unachievable Shannon plot 502, maximum likelihood (ML) plot 504, linear receiver plot 506, and DPoD linear receiver plot 508. The ML is the upper bound of achievable performance (an "ideal algorithm") given "infinite complexity." The graph 500 illustrates the improvement of the systems and techniques described herein compared to an existing method, and the distance or error of the systems and techniques to the ML ideal algorithm.

In some aspects, linear receiver plot 506 can correspond to performance of a receiver without implementing a DPoD algorithm. In some cases, data point 518 on linear receiver plot 506 can correspond to outBO value of ~7 dB in which the throughput is limited by non-linear distortion (e.g., Xpre is greater than 0). In some aspects, the throughput may be improved by increasing outBO (e.g., decreasing TX power) by ~3 dB corresponding to data point 510 on linear receiver plot 506. In some examples, data point 512 on linear receiver plot 506 may correspond to outBO value of ~12 dB in which the throughput is limited by thermal noise (e.g., Xpre is less than 0). In some aspects, the throughput may be improved by decreasing outBO (e.g., increasing TX power) by ~2 dB corresponding to data point 510 on linear receiver plot 506.

In some aspects, DPoD linear receiver plot 508 can correspond to performance of a receiver that has implemented a DPoD algorithm. As noted above, implementation of DPoD algorithm can reduce effects of clipping at higher transmit power levels (e.g., lower outBO) relative to a linear receiver that does not implement DPoD. In some aspects, DPoD linear receiver plot 508 can yield a higher throughput than linear receiver plot 506 for a particular power level. In some cases, data point 514 on DPoD linear receiver plot 508 may correspond to outBO value of ~4 dB in which the throughput is limited by non-linear distortion (e.g., Xpost is greater than 0). In some aspects, the throughput may be improved by increasing outBO (e.g., decreasing TX power) by ~1 dB corresponding to data point 516 on DPoD linear receiver plot 508. In some examples, data point 518 on DPoD linear receiver plot 508 may correspond to outBO value of ~8 dB in which the throughput is limited by thermal noise (e.g., Xpost is less than 0). In some aspects, the throughput may be improved by decreasing outBO (e.g., increasing TX power) by ~3 dB corresponding to data point 516 on DPoD linear receiver plot 508.

Figure 6:
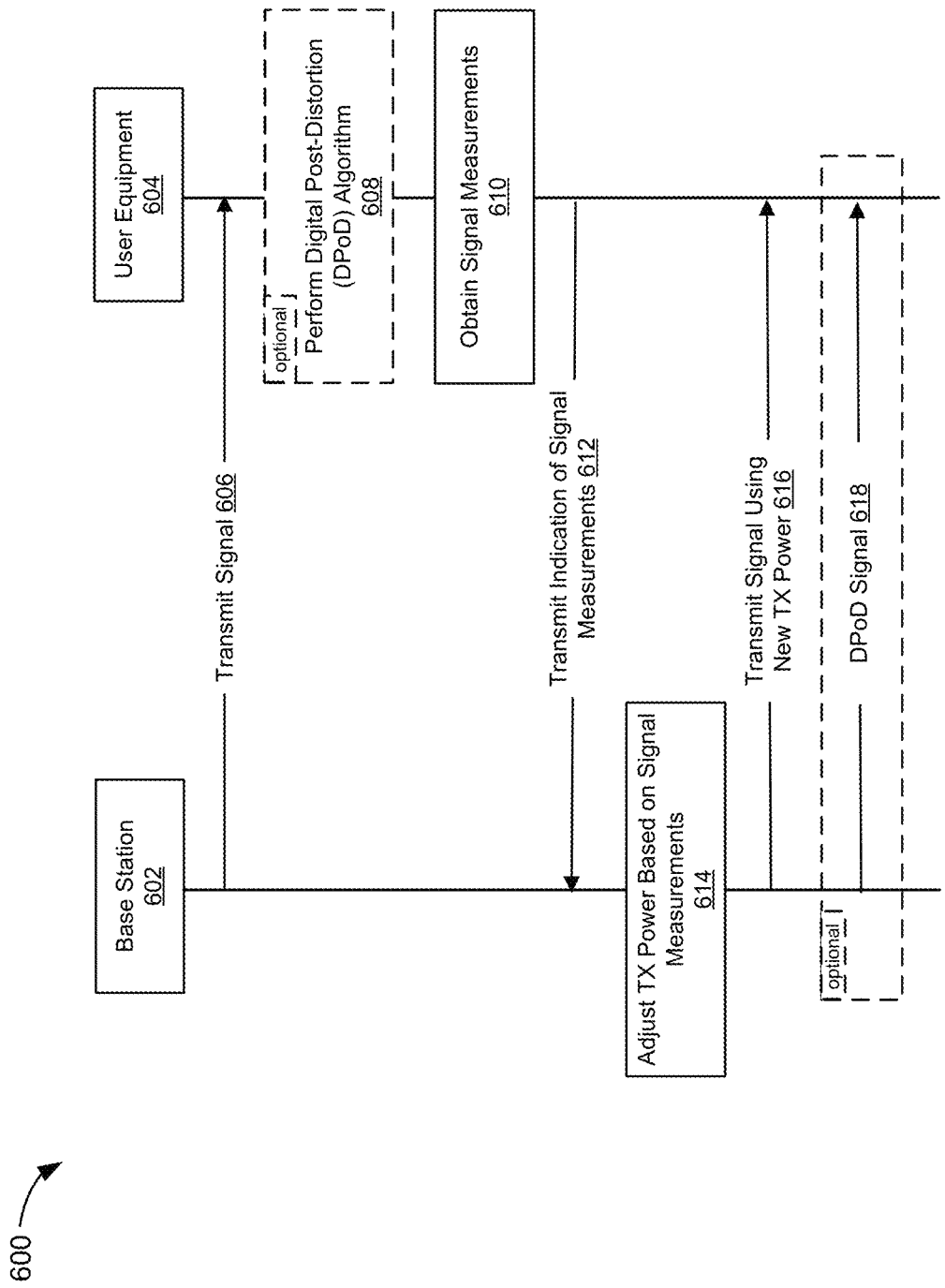
FIG. 6 is a sequence diagram illustrating an example of a sequence for adjusting base station transmit power based on user equipment signal measurements, according to aspects of the disclosure.

FIG. 6 is a sequence diagram illustrating an example of a sequence 600 for adjusting the transmit power used by a base station based on UE signal measurements. The sequence 600 may be performed by a base station 602 and a user equipment (UE) 604. At action 606, base station 602 may transmit a signal to UE 604. In some cases, the signal transmission may correspond to a Physical Sidelink Shared Channel (PSSCH) transmission, a Channel State Information Reference Signal (CSI-RS) transmission, a Sounding Reference Signal (SRS) transmission, a Positioning Reference Signal (PRS) transmission, any other signal transmission, and/or any combination thereof.

At action 608, UE 604 may optionally implement a digital post-distortion (DPoD) algorithm. In some cases, a DPoD algorithm may be implemented by a receiver to reduce non-linear distortion. In some aspects, a DPoD algorithm may be used to estimate the non-linearity of the entire array in the receiver while limiting model mismatch. In some examples, DPoD may reduce in-band distortion introduced by crest factor reduction (CFR) techniques used by a transmitter.

At action 610, UE 604 may obtain signal measurements associated with the transmission from base station 602 (e.g., received by UE 604 at action 606). In some aspects, the signal measurements may include non-linear distortion power measurements, thermal noise power measurements, a signal-to-noise ratio (SNR) measurements, signal-to-noise and interference ratio (SINR) measurements, reference signal received power (RSRP) measurements, received signal strength indicator (RSSI), channel quality indicator (CQI), any other suitable measurement, and/or any combination thereof. In some cases, the measurements may be performed before and/or after implementation of optional DPoD algorithm. For example, UE 604 may measure non-linear distortion either before and/or after implementing DPoD.

In some examples, UE 604 may calculate a noise parameter that indicates a relation between non-linear distortion power and thermal noise power. As noted above, a pre-DPoD noise parameter (e.g., Xpre) may correspond to a relation (e.g., difference, ratio, etc.) between a thermal noise power measurement and a pre-DPoD non-linear distortion power measurement, and a post-DPoD noise parameter (Xpost) may correspond to a relation (e.g., difference, ratio, etc.) between a thermal noise power measurement and a post-DPoD non-linear distortion power measurement (e.g., non-linear distortion power measured after implementing DPoD algorithm).

At action 612, UE 604 may transmit an indication of signal measurements to base station 602. In some cases, the indication of the signal measurements may correspond to the numeric value of the measurements. In some examples, the indication of the signal measurements may include the pre-DPoD noise parameter (e.g., Xpre) and/or the post-DPoD noise parameter (Xpost). In some instances, the indication of signal measurements may be sent as part of a channel state information (CSI) report. In some aspects, the indication of signal measurements may be sent as part of an acknowledgment (ACK) signal and/or a negative acknowledgment (NACK) signal.

At action 614, base station 602 may adjust the transmit power used for DL transmissions to UE 604 based on the signal measurements. In some cases, base station 602 may determine the pre-DPoD noise parameter (e.g., Xpre) and/or the post-DPoD noise parameter (Xpost) based on signal measurements (e.g., UE 604 may provide raw measurements to base station 602). In some aspects, base station 602 may use signal measurements to determine whether the transmit power should be increased or decreased. In some cases, base station 602 may determine that the transmit power should be increased when channel throughput is limited by thermal noise (e.g., the Xpre and/or Xpost parameters have a negative value). In some aspects, base station 602 may determine that the transmit power should be decreased when channel throughput is limited by non-linear distortion (e.g., the Xpre and/or Xpost parameters have a positive value).

At action 616, base station 602 may transmit a signal to UE 604 using the adjusted transmit power level. In some aspects, UE 604 may report further measurements and/or noise parameters to base station 602 for further refinement of the transmit power level (e.g., repeat actions 608 to 614). At action 618, base station 602 may optionally signal a DPoD instruction to UE 604. In some cases, the DPoD instruction may direct UE 604 to implement a DPoD algorithm. For example, base station 602 may direct UE 604 to implement DPoD in response to signal measurements corresponding to a pre-DPoD noise parameter. In some aspects, the DPoD instruction may direct UE 604 to discontinue implementation of a DPoD algorithm. For example, base station 602 may process the pre-DPoD noise parameter (e.g., Xpre) and the post-DPoD noise parameter (Xpost) from UE 604 and determine that throughput may be optimized without DPoD.

Figure 7:
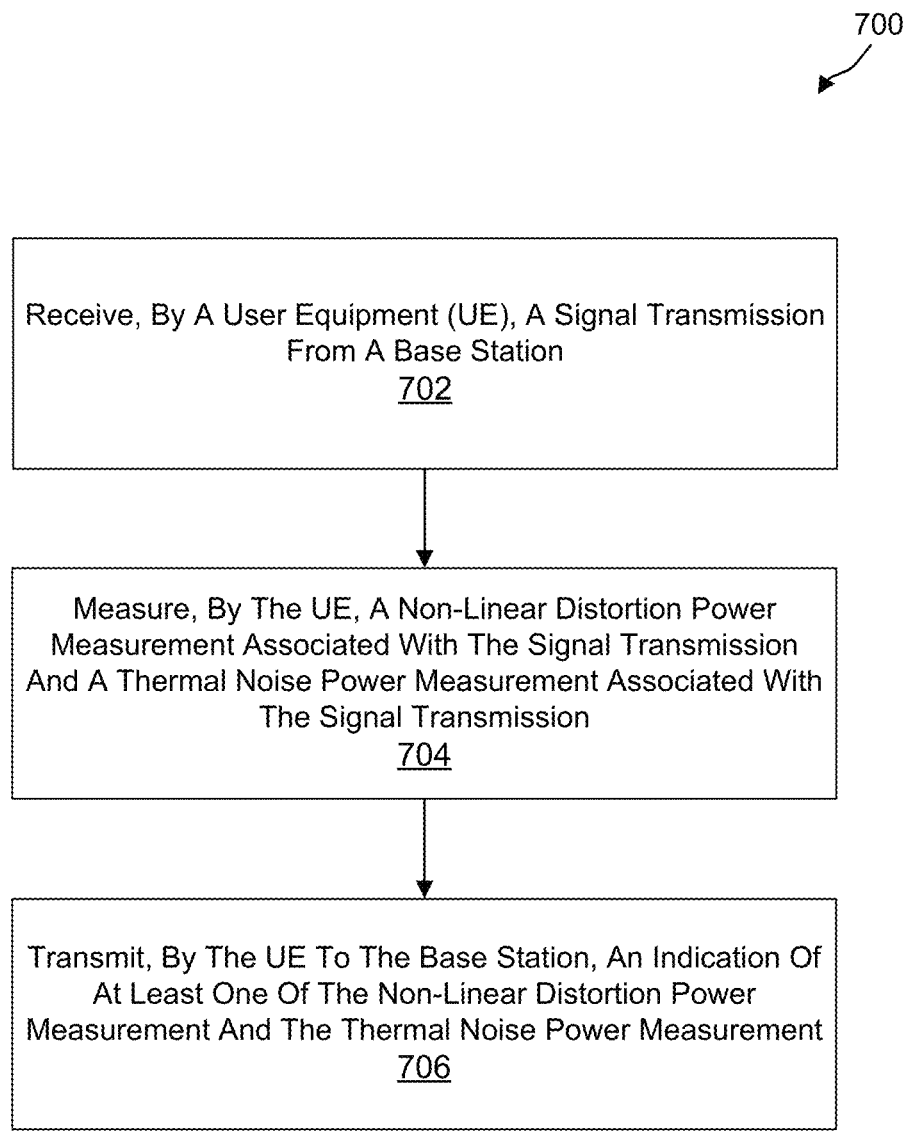
FIG. 7 is a flow diagram illustrating an example of a process for adjusting base station transmit power based on user equipment signal measurements, according to aspects of the disclosure.

FIG. 7 is a flowchart diagram illustrating an example of a process 700 for adjusting the transmit power level used by a base station based on user equipment (UE) signal measurements. At block 702, the process 700 includes receiving, by a UE, a signal transmission from a base station. For example, UE 404 and/or UE 406 may receive a signal transmission from base station 402. In some examples, the signal transmission may correspond to a channel state information reference signal (CSI-RS). In some aspects, the signal transmission may correspond to a physical downlink shared channel (PDSCH) transmission.

At block 704, the process 700 includes measuring, by the UE, a non-linear distortion power measurement associated with the signal transmission and a thermal noise power measurement associated with the signal transmission. For example, UE 404 and/or UE 406 may determine one or more signal measurements associated with a signal transmission from base station 402. In some cases, the signal measurements may include non-linear distortion power measurements, thermal noise power measurements, a signal-to-noise ratio (SNR) measurements, signal-to-noise and interference ratio (SINR) measurements, reference signal received power (RSRP) measurements, received signal strength indicator (RSSI), channel quality indicator (CQI), any other suitable measurement, and/or any combination thereof.

At block 706, the process 700 includes transmitting, by the UE to the base station, an indication of at least one of the non-linear distortion power measurement and the thermal noise power measurement. For instance, UE 404 and/or UE 406 may transmit an indication of at least one of the non-linear distortion power measurement and the thermal noise power measurement to base station 402. In some cases, the indication may be included in a channel state information (CSI) report. In some examples, the indication may be included in a negative acknowledgment (NACK) corresponding to the PDSCH transmission. In some instances, the indication may be included in an acknowledgment (ACK) corresponding to the PDSCH transmission.

In some aspects, the process 700 may include determining a first difference between the non-linear distortion power measurement and the thermal noise power measurement. In some cases, the indication may include the first difference. For example, UE 404 may determine a first difference between a non-linear distortion power measurement and a thermal noise power measurement which may correspond to a pre-DPoD noise parameter. In some examples, UE 404 may signal the pre-DPoD noise parameter to base station 402 (e.g., as part of CSI report, ACK, NACK, and/or any other suitable signaling method).

In some cases, the process 700 may include processing the signal transmission using a digital post-distortion (DPoD) algorithm to determine a reduced non-linear distortion power measurement. For example, UE 404 may process a DL transmission from base station 402 using a DPoD algorithm in order to reduce non-linear distortion associated with the DL transmission. In some examples, the process 700 may include determining a second difference between the reduced non-linear distortion power measurement and the thermal noise power measurement, wherein the indication includes the second difference. For instance, UE 404 may determine a second difference between a reduced non-linear distortion power measurement (e.g., measurement obtained after implementing DPoD) and a thermal noise power measurement. In some cases, the second difference may correspond to a post-DPoD noise parameter. In some examples, UE 404 may signal the post-DPoD noise parameter and the pre-DPoD noise parameter to base station 402 (e.g., as part of CSI report, ACK, NACK, and/or any other suitable signaling method).

In some examples, the process 700 may include processing the signal transmission using a digital post-distortion (DPoD) algorithm to determine a reduced non-linear distortion power measurement. In some cases, the process 700 may include determining a difference between the reduced non-linear distortion power measurement and the thermal noise power measurement, wherein the indication includes the difference. For example, UE 404 may process a DL transmission from base station 402 using a DPoD algorithm in order to reduce non-linear distortion associated with the DL transmission. In some cases, UE 404 may determine a difference between a reduced non-linear distortion power measurement (e.g., measurement obtained after implementing DPoD) and a thermal noise power measurement. In some cases, the second difference may correspond to a post-DPoD noise parameter. In some examples, UE 404 may signal the post-DPoD noise parameter to base station 402 (e.g., as part of CSI report, ACK, NACK, and/or any other suitable signaling method).

In some cases, the indication may signal the base station to modify a transmit power level associated with one or more signal transmissions to the UE. For example, base station 402 may increase or decrease the transmit power level associated with signal transmission to UE 404 based on the indication. In one illustrative example, base station 402 may increase the transmit power level when the pre-DPoD noise parameter (Xpre) and/or the post-DPoD noise parameter (Xpost) indicates that signal throughput is limited by thermal noise. In another illustrative example, base station 402 may decrease the transmit power level when the pre-DPoD noise parameter (Xpre) and/or the post-DPoD noise parameter (Xpost) indicates that signal throughput is limited by non-linear distortion.

Figure 8:
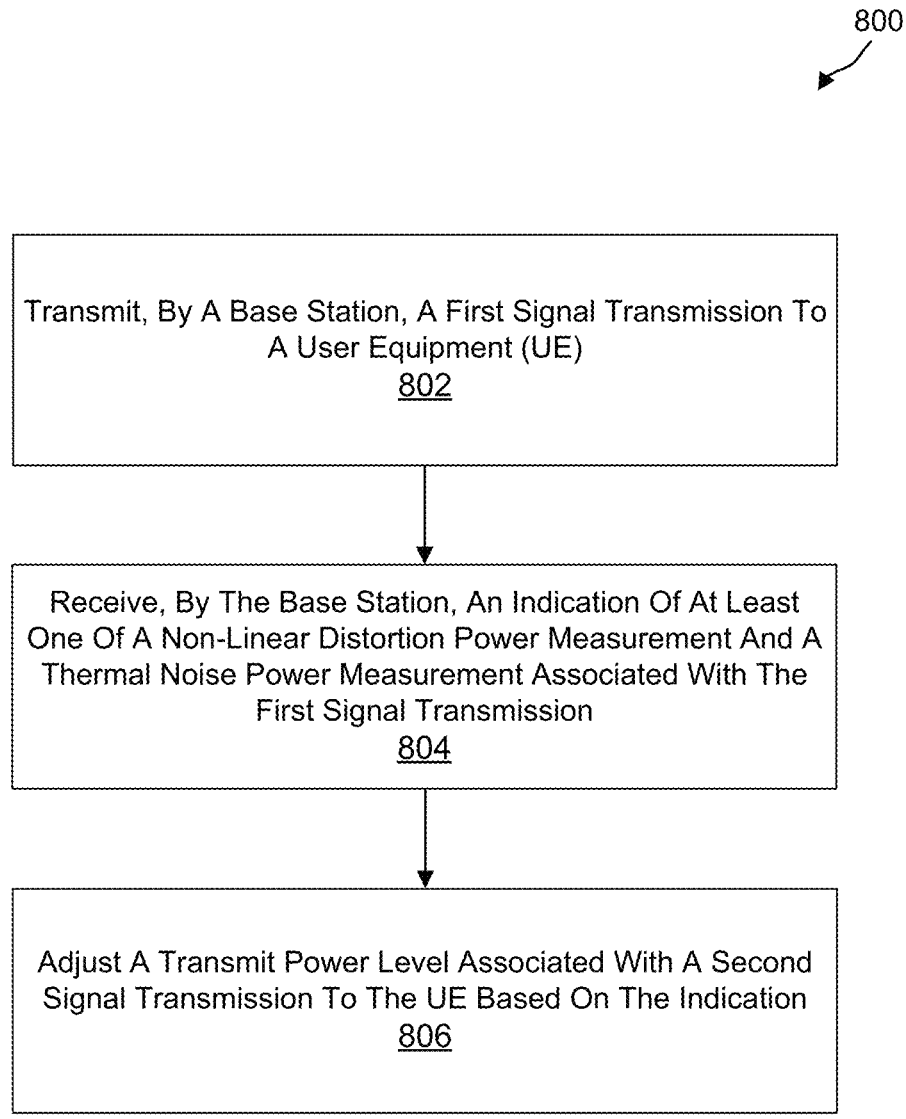
FIG. 8 is a flow diagram illustrating another example of a process for adjusting base station transmit power based on user equipment signal measurements, according to aspects of the disclosure.

FIG. 8 is a flowchart diagram illustrating an example of a process 800 for adjusting the transmit power level used by a base station based on user equipment (UE) signal measurements. At block 802, the process 800 includes transmitting, by a base station, a first signal transmission to a user equipment (UE). For example, base station 402 may transmit a signal to UE 404 and/or UE 406. In some cases, the signal transmission may correspond to a channel state information reference signal (CSI-RS). In some aspects, the signal transmission may correspond to a physical downlink shared channel (PDSCH) transmission.

At block 804, the process 800 includes receiving, by the base station, an indication of at least one of a non-linear distortion power measurement and a thermal noise power measurement associated with the first signal transmission. For instance, base station 402 may receive an indication of a non-linear distortion power measurement and/or a thermal noise power measurement from UE 404 and/or UE 406. In some cases, the indication may be included in a channel state information (CSI) report received from the UE. In some examples, the indication may be included in a negative acknowledgment (NACK) corresponding to the PDSCH transmission. In some instances, the indication may be included in an acknowledgment (ACK) corresponding to the PDSCH transmission. In some aspects, the non-linear distortion power measurement may correspond to a reduced non-linear distortion power measurement based on a digital post-distortion (DPoD) algorithm. For example, UE 404 may measure and report the non-linear power distortion to base station 402 after implementing a DPoD algorithm.

In some aspects, the indication may include a first difference between the non-linear distortion power measurement and the thermal noise power measurement. For example, UE 404 may determine a first difference between a non-linear distortion power measurement and a thermal noise power measurement which may correspond to a pre-DPoD noise parameter. In some examples, UE 404 may signal the pre-DPoD noise parameter to base station 402 (e.g., as part of CSI report, ACK, NACK, and/or any other suitable signaling method).

In some examples, the indication may include a second difference between a reduced non-linear distortion power measurement and the thermal noise power measurement, wherein the reduced non-linear distortion power measurement is based on a digital post-distortion (DPoD) algorithm. For instance, UE 404 may determine a second difference between a reduced non-linear distortion power measurement (e.g., measurement obtained after implementing DPoD) and a thermal noise power measurement. In some cases, the second difference may correspond to a post-DPoD noise parameter. In some aspects, the indication may include the first difference (e.g., pre-DPoD noise parameter) and the second difference (e.g., post-DPoD noise parameter).

In some cases, the indication includes a difference between a reduced non-linear distortion power measurement and the thermal noise power measurement, wherein the reduced non-linear distortion power measurement is based on a digital post-distortion (DPoD) algorithm. For instance, UE 404 may determine a post-DPoD noise parameter and signal the post-DPoD noise parameter to base station 402 (e.g., independently of the pre-DPoD noise parameter).

At block 806, the process 800 includes adjusting a transmit power level associated with a second signal transmission to the UE based on the indication. For example, base station 402 may adjust the transmit power level used with DL transmission to UE 404 and/or UE 406 based on the indication (e.g., signal measurements, Xpre, Xpost, etc.). In some aspects, adjusting the transmit power level may include determining that the non-linear distortion power measurement is greater than the thermal noise power measurement and decreasing the transmit power level associated with the second signal transmission to the UE. For example, base station 402 may use the post-DPoD noise parameter and/or the pre-DPoD noise parameter to determine that channel throughput is limited by non-linear distortion. In response, base station 402 may reduce the transmit power level associated with DL transmission to UE 404.

In some cases, adjusting the transmit power level may include determining that the non-linear distortion power measurement is less than the thermal noise power measurement and increasing the transmit power level associated with the second signal transmission to the UE. For example, base station 402 may use the post-DPoD noise parameter and/or the pre-DPoD noise parameter to determine that channel throughput is limited by thermal noise. In response, base station 402 may increase the transmit power level associated with DL transmission to UE 404.

In some examples, the processes described herein (e.g., process 700, process 800, and/or other process described herein) may be performed by a computing device or apparatus (e.g., a UE, a base station, etc.). In one example, the process 700 may be performed by a wireless communication device, such as a UE (e.g., UE 307). In another example, the process 700 may be performed by a computing device with the computing system 900 shown in FIG. 9. For instance, a wireless communication device (e.g., the UE 404 of FIG. 4, mobile device, and/or other UE or device) with the computing architecture shown in FIG. 9 may include the components of the UE and may implement the operations of FIG. 7. In another example, process 800 may be performed by a base station, such as the base station 102 of FIG. 1. In another example, the process 800 may be performed by a computing device with the computing system 900 shown in FIG. 9. For instance, a base station (e.g., the base station 102 of FIG. 1) with the computing architecture shown in FIG. 9 may include the components of the base station and may implement the operations of FIG. 8.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The processes 700 and 800 are illustrated as logical flow diagrams, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 700, process 800, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
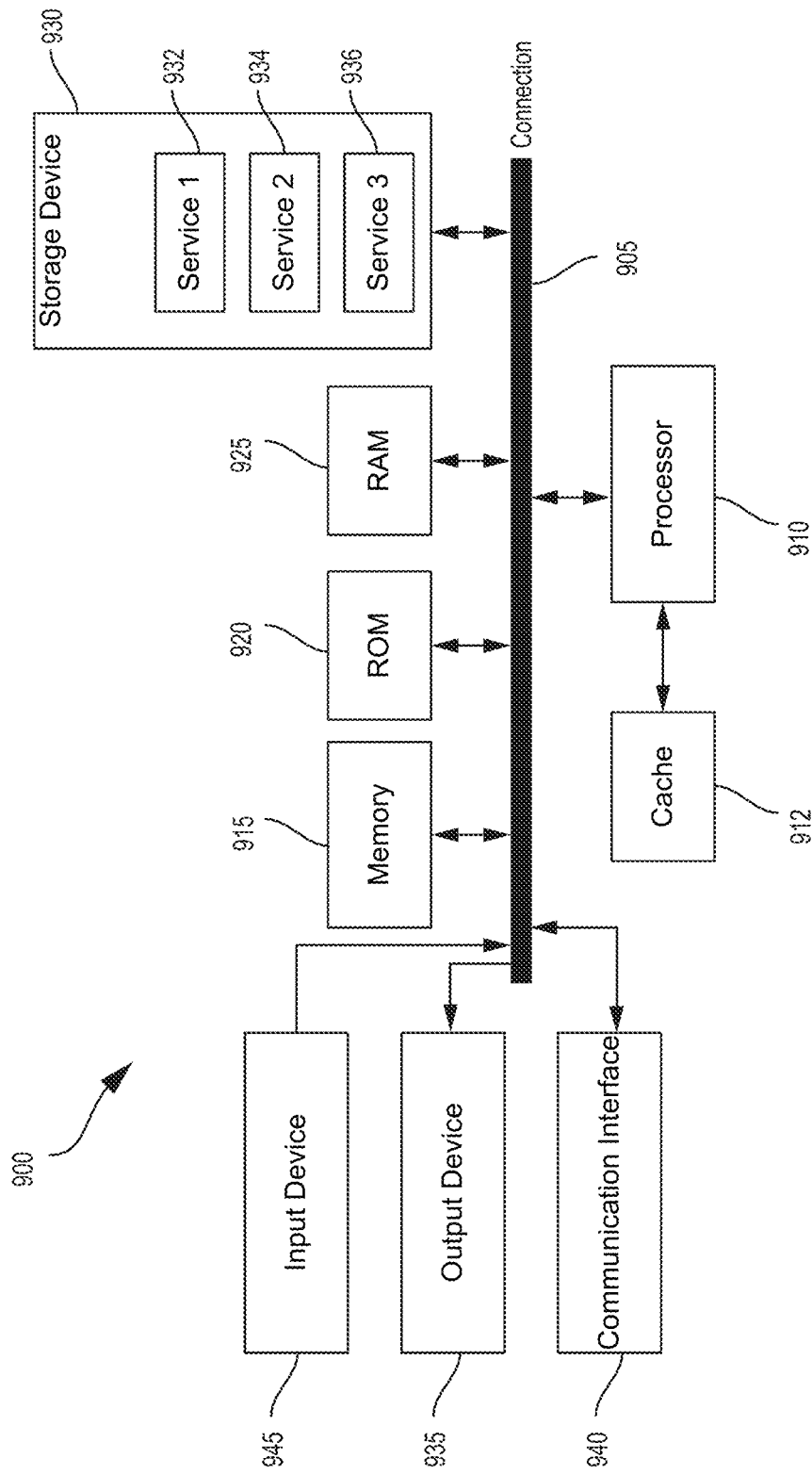
FIG. 9 is a block diagram illustrating an example of a computing system, according to aspects of the disclosure.

FIG. 9 is a diagram illustrating an example of a system for implementing certain aspects of the present technology. In particular, FIG. 9 illustrates an example of computing system 900, which may be for example any computing device making up internal computing system, a remote computing system, a camera, or any component thereof in which the components of the system are in communication with each other using connection 905. Connection 905 may be a physical connection using a bus, or a direct connection into processor 910, such as in a chipset architecture. Connection 905 may also be a virtual connection, networked connection, or logical connection.

In some embodiments, computing system 900 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 900 includes at least one processing unit (CPU or processor) 910 and connection 905 that communicatively couples various system components including system memory 915, such as read-only memory (ROM) 920 and random access memory (RAM) 925 to processor 910. Computing system 900 may include a cache 912 of high-speed memory connected directly with, in close proximity to, or integrated as part of processor 910.

Processor 910 may include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms. In some instances, multimodal systems may enable a user to provide multiple types of input/output to communicate with computing system 900.

Computing system 900 may include communications interface 940, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 may include software services, servers, services, etc., that when the code that defines such software is executed by the processor 910, it causes the system to perform a function. In some embodiments, a hardware service that performs a particular function may include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative examples of the disclosure include:

Aspect 1: A wireless communication device for wireless communication, comprising: at least one memory; at least one transceiver; and at least one processor coupled to the at least one transceiver and the at least one memory, wherein the at least one processor is configured to: receive, via the at least one transceiver, a signal transmission from a base station; measure a non-linear distortion power measurement associated with the signal transmission and a thermal noise power measurement associated with the signal transmission; and transmit, via the at least one transceiver to the base station, an indication of at least one of the non-linear distortion power measurement and the thermal noise power measurement.

Aspect 2: The wireless communication device of Aspect 1, wherein the signal transmission corresponds to a channel state information reference signal (CSI-RS).

Aspect 3: The wireless communication device of any of Aspects 1 to 2, wherein the indication is included in a channel state information (CSI) report.

Aspect 4: The wireless communication device of Aspect 1, wherein the signal transmission corresponds to a physical downlink shared channel (PDSCH) transmission.

Aspect 5: The wireless communication device of Aspect 4, wherein the indication is included in a negative acknowledgment (NACK) corresponding to the PDSCH transmission.

Aspect 6: The wireless communication device of any of Aspects 4 to 5, wherein the indication is included in an acknowledgment (ACK) corresponding to the PDSCH transmission.

Aspect 7: The wireless communication device of any of Aspects 1 to 6, wherein the at least one processor is further configured to: determine a first difference between the non-linear distortion power measurement and the thermal noise power measurement, wherein the indication includes the first difference.

Aspect 8: The wireless communication device of Aspect 7, wherein the at least one processor is further configured to: process the signal transmission using a digital post-distortion (DPoD) algorithm to determine a reduced non-linear distortion power measurement; and determine a second difference between the reduced non-linear distortion power measurement and the thermal noise power measurement, wherein the indication includes the second difference.

Aspect 9: The wireless communication device of any of Aspects 1 to 6, wherein the at least one processor is further configured to: process the signal transmission using a digital post-distortion (DPoD) algorithm to determine a reduced non-linear distortion power measurement; and determine a difference between the reduced non-linear distortion power measurement and the thermal noise power measurement, wherein the indication includes the difference.

Aspect 10: The wireless communication device of any of Aspects 1 to 9, wherein the indication signals the base station to modify a transmit power level associated with one or more signal transmissions to the wireless communication device.

Aspect 11: A method of performing any of the operations of Aspects 1 to 10.

Aspect 12: A computer-readable storage medium storing instructions that, when executed, cause one or more processors to perform any of the operations of Aspects 1 to 10.

Aspect 13: An apparatus comprising means for performing any of the operations of aspects 1 to 10.

Aspect 14: A base station for wireless communication, comprising: at least one memory; at least one transceiver; and at least one processor coupled to the at least one transceiver and the at least one memory, wherein the at least one processor is configured to: transmit, via the at least one transceiver, a first signal transmission to a user equipment (UE); receive, via the at least one transceiver, an indication of at least one of a non-linear distortion power measurement and a thermal noise power measurement associated with the first signal transmission; and adjust a transmit power level associated with a second signal transmission to the UE based on the indication.

Aspect 15: The base station of Aspect 14, wherein the first signal transmission corresponds to a channel state information reference signal (CSI-RS).

Aspect 16: The base station of any of Aspects 14 to 15, wherein the indication is included in a channel state information (CSI) report received from the UE.

Aspect 17: The base station of Aspect 14, wherein the first signal transmission corresponds to a physical downlink shared channel (PDSCH) transmission.

Aspect 18: The base station of Aspect 17, wherein the indication is included in a negative acknowledgment (NACK) corresponding to the PDSCH transmission.

Aspect 19: The base station of Aspect 17, wherein the indication is included in an acknowledgment (ACK) corresponding to the PDSCH transmission.

Aspect 20: The base station of any of Aspects 14 to 19, wherein the indication includes a first difference between the non-linear distortion power measurement and the thermal noise power measurement.

Aspect 21: The base station of Aspect 20, wherein the indication includes a second difference between a reduced non-linear distortion power measurement and the thermal noise power measurement, wherein the reduced non-linear distortion power measurement is based on a digital post-distortion (DPoD) algorithm.

Aspect 22: The base station of any of Aspects 14 to 19, wherein the indication includes a difference between a reduced non-linear distortion power measurement and the thermal noise power measurement, wherein the reduced non-linear distortion power measurement is based on a digital post-distortion (DPoD) algorithm.

Aspect 23: The base station of any of Aspects 14 to 22, wherein to adjust the transmit power level the at least one processor is further configured to: determine that the non-linear distortion power measurement is greater than the thermal noise power measurement; and decrease the transmit power level associated with the second signal transmission to the UE.

Aspect 24: The base station of any of Aspects 14 to 23, wherein to adjust the transmit power level the at least one processor is further configured to: determine that the non-linear distortion power measurement is less than the thermal noise power measurement; and increase the transmit power level associated with the second signal transmission to the UE.

Aspect 25: The base station of any of Aspects 14 to 24, wherein the non-linear distortion power measurement corresponds to a reduced non-linear distortion power measurement based on a digital post-distortion (DPoD) algorithm.

Aspect 26: A method of performing any of the operations of aspects 14 to 25.

Aspect 27: A computer-readable storage medium storing instructions that, when executed, cause one or more processors to perform any of the operations of aspects 14 to 25.

Aspect 28: An apparatus comprising means for performing any of the operations of aspects 14 to 25.

What is claimed is:

1. A method for wireless communications, comprising:
   receiving, by a user equipment (UE), a signal transmission from a network entity;
   measuring, by the UE, a non-linear distortion power measurement associated with the signal transmission and a thermal noise power measurement associated with the signal transmission; and
   transmitting, by the UE to the network entity, an indication of the non-linear distortion power measurement and the thermal noise power measurement, wherein the indication signals the network entity to modify a transmit power level associated with one or more signal transmissions to the UE.

2. The method of claim 1, wherein the signal transmission corresponds to a channel state information reference signal (CSI-RS).

3. The method of claim 2, wherein the indication is included in a channel state information (CSI) report.

4. The method of claim 1, wherein the signal transmission corresponds to a physical downlink shared channel (PDSCH) transmission.

5. The method of claim 4, wherein the indication is included in a negative acknowledgment (NACK) corresponding to the PDSCH transmission.

6. The method of claim 4, wherein the indication is included in an acknowledgment (ACK) corresponding to the PDSCH transmission.

7. The method of claim 1, further comprising:
   determining a first difference between the non-linear distortion power measurement and the thermal noise power measurement, wherein the indication includes the first difference.

8. The method of claim 7, further comprising:
   processing the signal transmission using a digital post-distortion (DPoD) algorithm to determine a reduced non-linear distortion power measurement; and
   determining a second difference between the reduced non-linear distortion power measurement and the thermal noise power measurement, wherein the indication includes the second difference.

9. The method of claim 1, further comprising:
   processing the signal transmission using a digital post-distortion (DPoD) algorithm to determine a reduced non-linear distortion power measurement; and
   determining a difference between the reduced non-linear distortion power measurement and the thermal noise power measurement, wherein the indication includes the difference.

10. An apparatus for wireless communications, comprising:
    at least one memory;
    at least one transceiver; and
    at least one processor coupled to the at least one transceiver and the at least one memory, wherein the at least one processor is configured to:
      receive, via the at least one transceiver, a signal transmission from a network entity;
      measure a non-linear distortion power measurement associated with the signal transmission and a thermal noise power measurement associated with the signal transmission; and
      transmit, via the at least one transceiver to the network entity, an indication of the non-linear distortion power measurement and the thermal noise power measurement, wherein the indication signals the network entity to modify a transmit power level associated with one or more signal transmissions to the apparatus.

11. The apparatus of claim 10, wherein the signal transmission corresponds to a channel state information reference signal (CSI-RS).

12. The apparatus of claim 11, wherein the indication is included in a channel state information (CSI) report.

13. The apparatus of claim 10, wherein the signal transmission corresponds to a physical downlink shared channel (PDSCH) transmission.

14. The apparatus of claim 13, wherein the indication is included in a negative acknowledgment (NACK) corresponding to the PDSCH transmission.

15. The apparatus of claim 13, wherein the indication is included in an acknowledgment (ACK) corresponding to the PDSCH transmission.

16. The apparatus of claim 10, wherein the at least one processor is configured to:
determine a first difference between the non-linear distortion power measurement and the thermal noise power measurement, wherein the indication includes the first difference.

17. The apparatus of claim 16, wherein the at least one processor is configured to:
process the signal transmission using a digital post-distortion (DPoD) algorithm to determine a reduced non-linear distortion power measurement; and
determine a second difference between the reduced non-linear distortion power measurement and the thermal noise power measurement, wherein the indication includes the second difference.

18. The apparatus of claim 10, wherein the at least one processor is configured to:
process the signal transmission using a digital post-distortion (DPoD) algorithm to determine a reduced non-linear distortion power measurement; and
determine a difference between the reduced non-linear distortion power measurement and the thermal noise power measurement, wherein the indication includes the difference.

19. A method of wireless communications, comprising:
transmitting, by a network entity, a first signal transmission to a user equipment (UE);
receiving, by the network entity base station, an indication of a non-linear distortion power measurement and a thermal noise power measurement associated with the first signal transmission; and
adjusting, based on the indication of the non-linear distortion power measurement and the thermal noise power measurement associated with the first signal transmission, a transmit power level associated with a second signal transmission to the UE.

20. The method of claim 19, wherein the first signal transmission corresponds to a channel state information reference signal (CSI-RS), and wherein the indication is included in a channel state information (CSI) report received from the UE.

21. The method of claim 19, wherein the first signal transmission corresponds to a physical downlink shared channel (PDSCH) transmission, and wherein the indication is included in at least one of a negative acknowledgment (NACK) corresponding to the PDSCH transmission and an acknowledgment (ACK) corresponding to the PDSCH transmission.

22. The method of claim 19, wherein the indication includes a first difference between the non-linear distortion power measurement and the thermal noise power measurement.

23. The method of claim 22, wherein the indication includes a second difference between a reduced non-linear distortion power measurement and the thermal noise power measurement, wherein the reduced non-linear distortion power measurement is based on a digital post-distortion (DPoD) algorithm.

24. The method of claim 19, wherein the indication includes a difference between a reduced non-linear distortion power measurement and the thermal noise power measurement, wherein the reduced non-linear distortion power measurement is based on a digital post-distortion (DPoD) algorithm.

25. The method of claim 19, wherein adjusting the transmit power level comprises:
determining that the non-linear distortion power measurement is greater than the thermal noise power measurement; and
decreasing the transmit power level associated with the second signal transmission to the UE.

26. The method of claim 19, wherein adjusting the transmit power level comprises:
determining that the non-linear distortion power measurement is less than the thermal noise power measurement; and
increasing the transmit power level associated with the second signal transmission to the UE.

27. A network entity for wireless communication, comprising:
at least one memory;
at least one transceiver; and
at least one processor coupled to the at least one transceiver and the at least one memory, wherein the at least one processor is configured to:
transmit, via the at least one transceiver, a first signal transmission to a user equipment (UE);
receive, via the at least one transceiver, an indication of non-linear distortion power measurement and a thermal noise power measurement associated with the first signal transmission; and
adjust, based on the indication of the non-linear distortion power measurement and the thermal noise power measurement associated with the first signal transmission, a transmit power level associated with a second signal transmission to the UE.

28. The network entity of claim 27, wherein the non-linear distortion power measurement corresponds to a reduced non-linear distortion power measurement based on a digital post-distortion (DPoD) algorithm.

29. The network entity of claim 27, wherein the first signal transmission corresponds to a channel state information reference signal (CSI-RS), and wherein the indication is included in a channel state information (CSI) report received from the UE.

30. The network entity of claim 27, wherein the first signal transmission corresponds to a physical downlink shared channel (PDSCH) transmission, and wherein the indication is included in at least one of a negative acknowledgment (NACK) corresponding to the PDSCH transmission and an acknowledgment (ACK) corresponding to the PDSCH transmission.

* * * * *